United States Patent [19]
Bailly et al.

[11] Patent Number: 4,719,562
[45] Date of Patent: Jan. 12, 1988

[54] MULTIPROCESSOR SYSTEM FOR INTERCOMMUNICATION OF PROCESSORS

[75] Inventors: Francois P. Bailly, Palaiseau; Alain Bourgoin; Francois Vaillant, both of Dourdan, all of France

[73] Assignee: SAT Societe Anonyme de Telecommunications, France

[21] Appl. No.: 631,986

[22] Filed: Jul. 18, 1984

[30] Foreign Application Priority Data

Jul. 19, 1983 [FR] France .................. 83 11892

[51] Int. Cl.[4] .................. G06F 13/00; G06F 15/16
[52] U.S. Cl. ................................. 364/200
[58] Field of Search ... 364/200 MS File, 900 MS File

[56] References Cited
U.S. PATENT DOCUMENTS

| | | | |
|---|---|---|---|
| 4,209,839 | 6/1980 | Bederman | 364/200 |
| 4,253,144 | 2/1981 | Bellamy et al. | 364/200 |
| 4,354,225 | 10/1982 | Frieder et al. | 364/200 |
| 4,368,514 | 1/1983 | Persaud | 364/200 |
| 4,404,628 | 9/1983 | Angelo | 364/200 |

FOREIGN PATENT DOCUMENTS

| | | |
|---|---|---|
| 8400221 | 1/1984 | PCT Int'l Appl. . |
| 2011680 | 7/1979 | United Kingdom . |
| 2078407 | 1/1982 | United Kingdom . |
| 2080582 | 2/1982 | United Kingdom . |
| 2091917 | 8/1982 | United Kingdom . |

OTHER PUBLICATIONS

Microprocessors and Their Applications, Fifth Euromicro Symposium on Microprocessing and Microprocessing ad Microprogramming, 28–30 aout 1979, Goteborg, pp. 317–327, North–Holland Publishing Company, Amsterdam (NL): H. A. Deshmukh et al.: "A Hierarchically Structured Multi-Microprocessor System", *FIG. 4 de p. 321; FIG. 5 de p. 322; p. 323; Premiere Colonne, Deuxieme Colonne, lignes 1–7*.
Electronic Design, vol. 24, No. 12, 7 Jun. 1976, pp. 132–136, Rochelle Park, (U.S.A.); D. Chung: "Multiprocessor Control Systems", *p. 136, Premiere Colonne, lignes 8–36, Deuxieme Colonne, lignes 1–24; FIG. 11*.

Primary Examiner—Eddie P. Chan
Attorney, Agent, or Firm—Stevens, Davis, Miller & Mosher

[57] ABSTRACT

The system according to the invention comprises a central microprocessor and peripheral microprocessors. A direct-access transfer memory is provided for the communication of the processors with one another. The memory is divided into as many distinct, determined zones as there are peripheral processors. The memory is connected to two addressing buses of which the latter serves equally well to address the boxes of the memory by the central microprocessor and to address the zones of the memory allocated to the peripheral microprocessors. The system is particularly well adapted to data transfers between a telephone automatic switch and subscribers' sets.

2 Claims, 1 Drawing Figure

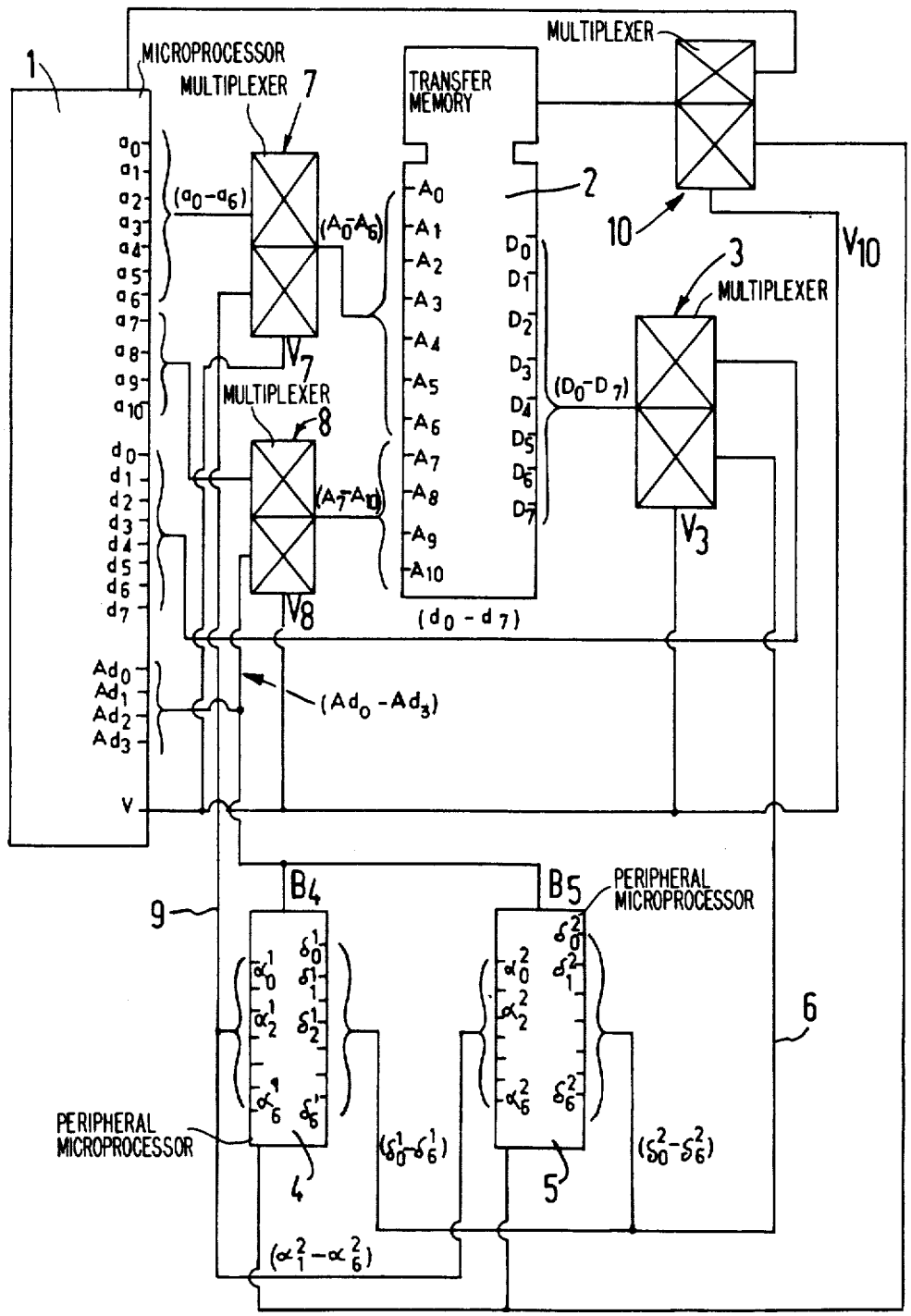

MULTIPROCESSOR SYSTEM FOR INTERCOMMUNICATION OF PROCESSORS

BACKGROUND OF THE INVENTION

The present invention relates to a multiprocessor system for inter-communication of processors, comprising a microprocessor, preferably a determined one of the microprocessors, called central microprocessor, and microprocessors, consequently the other microprocessors, called peripheral microprocessors.

It should firstly be emphasized that the microprocessor qualified as the central microprocessor may not always be the same one, and corresponds to a system in which all the microprocessors are identical and may equally well become this central microprocessor, for example in turn.

However, the present invention is not limited to this concept.

Such multiprocessor systems are encountered in telephony, and in particular in private telephony.

Consider a telephone system constructed around an automatic switch. This automatic switch comprises a connection network by which it may be connected to the different lines of a telephone network, on the one hand, and to the different subscribers' sets, on the other hand. The automatic switch comprises a central unit microprocessor, which may and must be connected to the peripheral unit microprocessors, called junctor cards; these cards each support a certain number of set junctors or network junctors.

In order to more readily understand the communication of the microprocessors according to the present invention, the automatic switch mentioned above and the messages which must for example be exchanged between it and the subscriber junctors in connection with the closure of the loop relays will be considered. A ringing exchange which sends a timed ringing current onto a network junctor of the automatic switch will be considered. The detection of this current is captured by the microprocessor of the card supporting the junctor of the line in question, which must then transfer it to the microprocessor of the central unit which in turn must trigger off the order of closure of the loop relay of the line, via the microprocessor of the card.

More generally, the peripheral processors must carry out the orders coming from the central processor and must shape the data to be transmitted to the central processor.

This may be carried out in real time and by sampling.

However, the more "network" lines, or the more subscribers' sets there are, the longer and heavier the communication of such messages becomes, from the standpoint of implementation.

It has already been proposed to use the memory, with which the microprocessor of the central unit is provided, in direct access mode.

In that case, and upon grant of the central unit microprocessor, the peripheral microprocessors may have direct access to a part of the memory of the central unit. However, this is an expensive solution as a controller is then necessary to write the data into the memory of the central unit microprocessor which, during this time, is stopped, even if such a stop is only of short duration.

It is therefore an object of the present invention to overcome this drawback.

SUMMARY OF THE INVENTION

To this end, the present invention relates to a multiprocessor system comprising a central microprocessor and peripheral microprocessors adapted to communicate with one another, characterized in that it comprises a transfer memory comprising predetermined distinct zones respectively allocated to the peripheral microprocessors, the central and peripheral microprocessors each being arranged to be master of the transfer memory.

During communications between the transfer memory and the peripheral processors, the central processor thus does not have to be stopped, and it may continue its own processing provided, whilst a peripheral processor is master of the transfer memory, the central processor denies itself access thereto. In addition to this first advantage, the invention presents a second.

The zones of the transfer memory allocated to the various peripheral processors being physically separated, there is no risk of one microprocessor erasing or overlaying in the transfer memory the date of another microprocessor. This is a safety factor.

In a preferred embodiment of the system of the invention, the central microprocessor is arranged to render each of the peripheral microprocessors master of the transfer memory and to address the whole of the corresponding zone of the transfer memory, and each peripheral microprocessor is arranged to address the unitary elements, in the present case octets, of its associated zone, directly.

In that case, the means for addressing the unitary elements of the transfer memory of the central microprocessor, when it is master of the transfer memory, advantageously comprise the addressing means of the zones associated with the peripheral microprocessors of the central microprocessor when the latter are masters of the transfer memory.

BRIEF DESCRIPTION OF THE DRAWINGS

The invention will be more readily understood on reading the following description with reference to the accompanying drawings, in which:

The single FIGURE shows a functional block diagram of the system.

DETAILED DESCRIPTION OF A PREFERRED EMBODIMENT OF THE INVENTION

Referring now to the drawing, the system described hereinbelow, a digital processing system, comprises a microprocessor of a private automatic switch, called central unit, and line or subscriber card microprocessors, called peripheral microprocessors. The system further comprises a transfer memory.

Simply by way of example, a transfer memory with a capacity of 2048 boxes or unitary elements; viz. $2^{11}$ boxes, will be considered.

It should be noted that addressing of the boxes of the transfer memory will be effected by means of eleven wire links.

The unitary element of the messages will, in the case in question, be the octet whose flow in one direction or the other between the transfer memory and one of the central or peripheral microprocessors will therefore be effected by means of eight wire links.

Furthermore, a system with a maximum of sixteen line or subscriber cards, therefore with sixteen peripheral microprocessors, will be considered, likewise in non-limiting manner.

Consequently, predetermined, distinct zones of 128 ($2^7$) octets are respectively allocated to the different peripheral microprocessors. This results in the addressing of the boxes of their respective zones being effected by means of seven wire links.

Finally, the addressing of the sixteen zones of the transfer memory and the sixteen peripheral microprocessors will be effected by four wire links, or four addressing bits in association with an addressing validation bit.

In the Figure, the microprocessor 1 of the central unit is connected to the transfer memory 2 via a data bus ($d_0$–$d_7$), a multiplexer 3, by one of its two inputs, and a multiplexed data bus ($D_0$–$D_7$). The peripheral microprocessors, of which only two, 4 and 5, are shown in the Figure for reasons of clarity, are connected to the second input of the multiplexer 3, respectively by data buses ($\delta^1_0$–$\delta^1_6$) and 6, on the one hand.

The central microprocessor 1 is also connected to the transfer memory 2 via, on the one hand, a first addressing bus ($a_0$–$a_6$) of low weight, a multiplexer 7 by one of its two inputs, and a multiplexed addressing bus ($A_0$–$A_6$), and, on the other hand, via a second addressing bus ($a_7$–$a_{10}$) of high weight, a multiplexer 8, by one of its two inputs, and a multiplexed addressing bus ($A_7$–$A_{10}$).

The peripheral microprocessors 4, 5 are also connected to the second input of the multiplexer 7 and therefore to the transfer memory 2, by addressing buses ($\alpha^1_0$–$\alpha^1_6$) and 9, on the one hand, and addressing buses ($\alpha^2_0$–$\alpha^2_6$) and 9, on the other hand.

Furthermore, the central microprocessor 1 is connected to the second input of the multiplexer 8 by an addressing bus of the peripheral microprocessors (Ad$_0$–Ad$_3$), which is itself ramified towards the microprocessors 4, 5 in two addressing buses B$_4$, B$_5$.

Finally, addressing validation links V$_3$, V$_7$, V$_8$ connect the central microprocessor 1 to the multiplexers 3, 7, 8, respectively; links connect the microprocessors to a multiplexeer 10 for read-write control of the transfer memory 2.

The system operates as follows:

The peripheral microprocessors 4, 5 execute the orders coming from the central microprocessor 1 and shape the data to be transmitted to the central microprocessor. As to the central microprocessor, it processes its data at a higher level, whilst being discharged of the real-time operations attributed to the peripheral microprocessors, taking their structure into account.

The transfer in both directions between the peripheral microprocessors and the central microprocessor are effected on the initiative of the latter which may therefore control the rate thereof. During these transfers, the central microprocessor 1 is not stopped and, without many restrictions, may continue its own processing, insofar as it does not have to use the transfer memory 2.

The data are therefore transferred both in rising and in descending direction, via the multiple access transfer memory 2 operating in shared time mode under the control of the central microprocessor 1.

The latter may have access to all the boxes of the memory 2 via the buses ($a_0$–$a_6$) and ($a_7$–$a_{10}$). It may also give access of the memory to one of the peripheral microprocessors, and more precisely to its zone associated with the memory, and deny itself access thereto.

This access is effected only by the multiplexed bus ($A_0$–$A_6$) so that, via the multiplexer 8, the multiplexed bus ($A_7$–$A_{10}$), of high weight, is connected to the zone addressing bus (Ad$_0$–Ad$_3$) of the central microprocessor 1. It may therefore be said in this respect that the means for addressing the boxes of the transfer memory 2 of the central microprocessor ($A_0$–$A_6$) and ($A_7$–$A_{10}$), when it is master of the transfer memory 2, comprise the means for addressing the zones associated with the peripheral microprocessors of the central microprocessor ($A_7$–$A_{10}$), when these peripheral microprocessors are masters of the transfer memory 2.

The peripheral microprocessors are therefore addressed by four bits, via the buses B$_4$, B$_5$, associated with a validation bit. These four addressing bits flow via the addressing terminals $A_7$–$A_{10}$ of high weight of the transfer memory 2.

It should be recalled here that, for the peripheral microprocessors, the transfer memory 2 is divided into distinct equal zones, 16 in the case in question, which form part of the read/write memory field accessible to the microprocessors.

When the central microprocessor 1 wishes to have access to the transfer memory 2, it inhibits the addressing validation bit of the peripheral microprocessors, which switches the data and addressing buses and the read/write control signals of the memory 2 onto the central microprocessor 1.

The central microprocessor 1 then has access to the transfer memory 2 and it may read the data written by the peripheral microprocessors during their preceding accesses, and write data destined for the peripheral microprocessors in their respective reserved zones.

For access of the peripheral microprocessors to the transfer memory 2, the central microprocessor 1 positions the addressing bits of the selected microprocessor as well as the addressing validation bit.

Decoding of the combination of the addressing bits of the peripheral microprocessors is effected, at each card, by a conventional logic device; decoding is taken into account by a peripheral microprocessor and from that moment, the latter may have access to the transfer memory 2 to read or write data therein.

Two processings are possible:

(1) the peripheral microprocessors have access to the transfer memory only for a predetermined time and can therefore effect only a likewise determined number of read-write operations;

(2) the peripheral microprocessors regularly test the combination of the addressing bits. When this combination changes state, for example passes from 0 to 1, the peripheral microprocessors terminate their pending cycle, in a determined lapse of time, and cease having access to the transfer memory 2.

By way of example, in the embodiment of the invention effectively produced by Applicants, the peripheral microprocessors are "monochip" 8051 microprocessors made by INTEL.

Of course, the multiplexers referred to hereinabove are bidirectional multiplexers.

In addition, the addressing bus (Ad$_0$–Ad$_3$) may be replaced by a simple counter, in the event of it being chosen to give the peripheral microprocessors access to the transfer memory in a determined, unchangeable order.

Operation of the system which has just been described may be summarized by the Table hereinbelow, which represents the numbers of the unitary elements, or boxes, of the transfer memory addressed to this memory depending on whether the central microprocessor or the peripheral microprocessors are masters thereof, as well as the number of the zones associated with the peripheral microprocessors.

| Master peripheral microprocessors | | Master central microprocessors |
|---|---|---|
| Zones | Boxes | Boxes |
| 0 | 0 | 0 |
| . | . | . |
| . | . | . |
| . | . | . |
| | 127 | 127 |
| 1 | 0 | 128 |
| . | . | . |
| . | . | . |
| . | . | . |
| | 127 | 255 |
| 15 | 0 | 1 920 |
| . | . | . |
| . | . | . |
| . | . | . |
| | 127 | 2 047 |

The system of the invention has been described with reference to a private telephone automatic switch associated with peripheral subscribers' sets, but it is clear that the invention is applicable to sectors other than telephony. It is applied to any system comprising microprocessors, or even processors, having to communicate with one another.

What is claimed is:

1. A multiprocessor system comprising:

a central processor and n peripheral processors communicating with one another;

a transfer memory comprising predetermined distinct zones having unitary elements, each of said zones allocated to and associated with and respectively accessed by its associated peripheral processors;

said central processor and said n peripheral processors each comprising means for mastering said transfer memory;

means for connecting said central processor to said transfer memory comprising a first addressing bus means and a first multiplexer having an input connected to said first addressing bus means and an output connected to said transfer memory, and a second addressing bus means and a second multiplexer having an input connected to said second addressing bus means and an output connected to said transfer memory, said means for connecting said central processor to said transfer memory comprising further bus means connecting said central processor to another input of said second multiplexer for addressing zones allocated to and associated with said peripheral processors when mastered by said central processor and for connecting said central processor to said peripheral processors;

said first and second addressing buses including means for addressing said unitary elements of said transfer memory;

said central processor including means for causing one of said pheripheral processors to master said transfer memory and for addressing a zone of said transfer memory associated with said one peripheral processor;

means for connecting peripheral processors to another input of said first multiplexer comprising addressing buses $\alpha^1, \alpha^2 \ldots \alpha^n$, respectively, each of n peripheral processors including means for addressing directly said unitary elements of said zone of said memory associated therewith; and means for addressing one of said zones associated with said peripheral processors when a respective one of said peripheral processor masters said transfer memory.

2. The multiprocessor system of claim 1, wherein said transfer memory has a capacity of 2048 octets and is divided into 16 zones of 128 octets.

* * * * *